April 3, 1962     O. KENNARD ET AL     3,028,496
MEASUREMENT OF DENSITIES OF PHOTOGRAPHIC IMAGES
Filed July 8, 1957
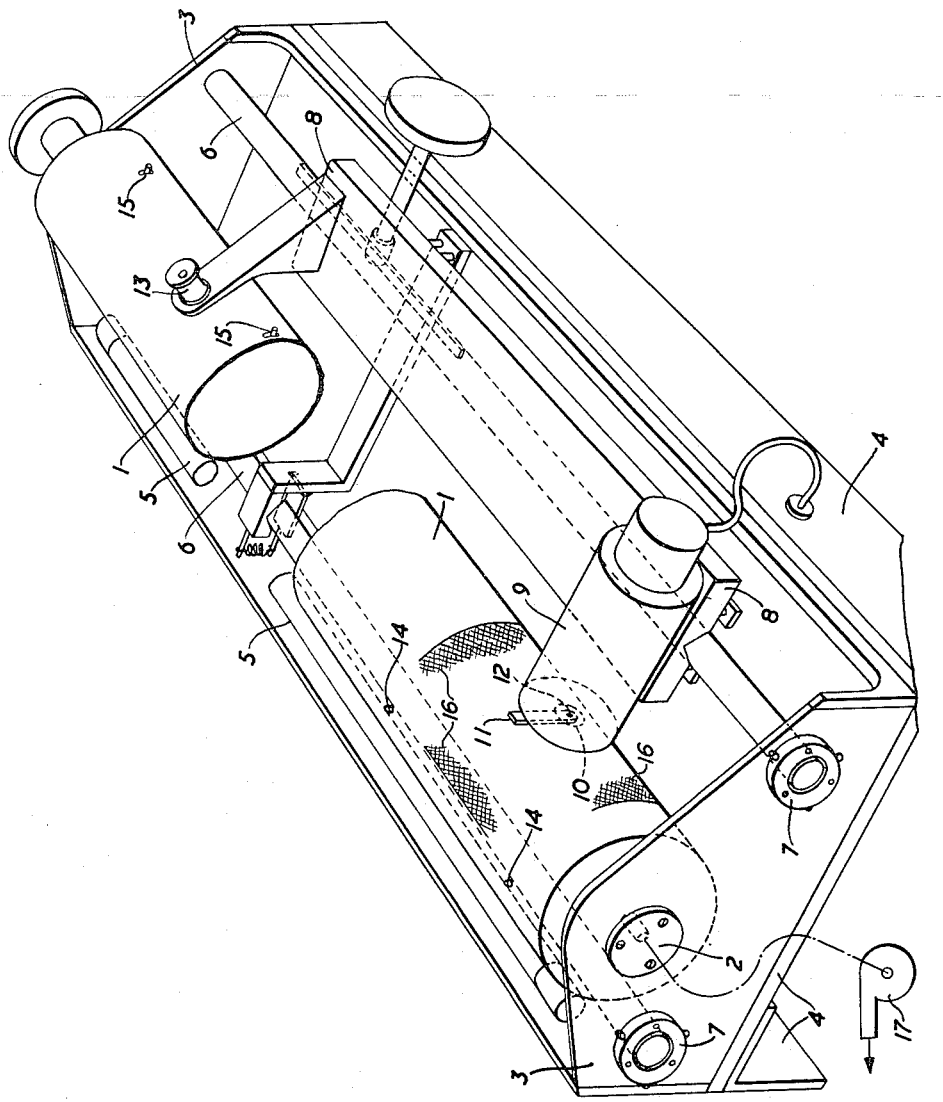
INVENTORS
Olga Kennard
Lawrence Leslie Woodget
By: Stevens, Davis, Miller & Mosher
ATTORNEY

United States Patent Office 3,028,496
Patented Apr. 3, 1962

---

3,028,496
MEASUREMENT OF DENSITIES OF PHOTOGRAPHIC IMAGES
Olga Kennard, Cambridge, and Laurence Leslie Woodget, Kenton, England, assignors to National Research Development Corporation, London, England, a British corporation
Filed July 8, 1957, Ser. No. 670,474
Claims priority, application Great Britain July 9, 1956
16 Claims. (Cl. 250—106)

This invention relates to the measurement of densities of photographic images, and has for an object to provide a method of and means for improving the accuracy and reproducibility of results in reading or interpreting photographic records. It has particular, although not exclusive, application to the estimation of the integrated densities of the spots obtained by X-ray diffraction techniques in crystallography.

Where an X-ray diffraction camera is used to study crystal structure, the exposed plate or film carries a large number of very small dark spots the relative integrated intensities of which are a function of the arrangement of atoms in the crystal structure. It is, therefore, important not only to be able to measure the integrated intensity of any one spot accurately, but also to ensure that repeated measurements give the same result. Hitherto, estimations of spot intensity have frequently been made by visual comparisons of the spots with graded density standards in the form of strips of film each carrying a number of bands or spots of known exposures. Whilst a skilled operator working by this method can achieve a reasonable degree of consistency of results, the variations between operators reading the same film can be undesirably high. Another method, which is unsuitable for films having several hundreds of spots, is to punch out each spot and estimate the weight of silver therein by a known technique.

It is already known to convert the stable silver image on a film to an invisible radio-active image wherein the total intensity of radioactivity over the area is proportional to the original silver content, and hence to the original density of the image. If, therefore, a film—such as an X-ray crystallographic film—were treated in this way, the integrated intensity of each spot or other area to be measured could be estimated by means of an ionisation counter or other device for measuring radiation (referred to herein for convenience as Geiger counters). Since, however, the radioactive image is invisible, some means is required for accurate positioning of the Geiger counter with respect to the film.

Although the radioactive image has been described above as "invisible," it is normally bleached, appearing white on an opaque ground. Hence the contrast between it and its background is too low to permit of the desired accuracy of location by visual optical methods. Again, persistent observation, through a direct-focusing telescope or like optical system, of radioactive images could easily lead to serious damage of an operator's eye. Furthermore, in the preferred embodiments of the invention, the radioactive film is mounted in a position such that the particular point or area of the image which is to be measured is inaccessible, at least for practical purposes, for direct optical observations. In this specification, therefore, the term "invisible" includes all the above conditions, and the term "film" includes plates wherever this is not repugnant to the context.

The present invention is a solution of the problem of accurately positioning an invisible image whereby, after an original film has been developed and fixed, a non-radioactive duplicate or control copy is made on which an exact replica of the image appears in visible form. This visible duplicate or control copy is then kept whilst the original is treated to bleach the silver image and render it radioactive by conversion to silver iodide using radioactive iodine ($I^{131}$).

The control copy thus provides a visible key to the now invisible radioactive image, so that by placing the two films in a frame or carrier in predetermined relationship, and mounting an optical eyepiece and a Geiger counter in the same relationship to each other for traverse relative to the carrier, the radioactive film can be accurately scanned by the Geiger counter by the process of scanning the visible image on the control film with the eyepiece.

The conversion of the silver image to silver iodide is preferably carried out by immersing the film in a bath of potassium ferricyanide and potassium iodide containing active iodine. Considerable care must be taken during this process to ensure uniformity of the conversion of the silver image to silver iodide over the whole film surface.

The invention also includes means for measuring the density of an exposed area of film after the area has been rendered radioactive and invisible comprising a carrier for the radioactive film and a non radioactive duplicate having a corresponding visible area, means for accurately correlating the positions of the two films on the carrier, and a Geiger counter and an optical eyepiece mounted for traverse in unison relative to the carrier so that the Geiger counter is positioned opposite the desired area of radio-active film when the eyepiece is aligned with the corresponding visible area on the duplicate.

The carrier is conveniently in the form of a drum on which the films can be mounted in predetermined relationship and which is rotatable about its own axis.

Advantageously, the carrier is transparent or translucent for the transmission of light through the duplicate film to assist in scanning thereof.

In the process of estimating the structure of an object—such as a crystal—by an X-ray diffraction method according to the invention, the object is mounted in known manner in, say, a drum camera. The film is clamped around the internal periphery of the drum and an X-ray beam is directed onto the object in the usual manner. Where an X-ray beam which has been diffracted by an atom in the object strikes the film, a spot appears whose position and optical density can be interpreted in terms of the nature of the atom and its position in the lattice structure.

When a complete exposure of the object has been made, the spots lie in two groups separated by an unexposed band which lies symmetrically about an axis across the film immediately opposite the collimator of the X-ray source. The object is now removed, and a series of spots is printed along this band, each being of a different and known exposure time. These spots act as a reference or control in the subsequent reading of the activated film, and provide a correction factor for the inevitable loss of radioactivity with time after the image has been rendered radioactive, as will be described below.

The exposed film is now developed and fixed in the customary way, and an optical duplicate or a control copy is then made from it, so that an exact duplicate image of the spot pattern is obtained. The stable silver image on the original film is then converted into a bleached and radioactive image by treatment in a solution of potassium ferricyanide and potassium iodide containing radio-active iodine, $I^{131}$. This combined bleaching and activating solution contains a minimum of 10 $\mu$-curies/cc., the strength controlling the slope of the curve relating exposure time to counts per minute.

A combined bleaching and activating solution which has been found to give satisfactory results is made up as follows:

0.55 gm. of potassium iodide and 50 gm. of potassium ferricyanide are dissolved in 50 cc. of buffer solution having a pH of 7.4. The buffer solution is made by dissolving 50 gm. of sodium acetate in 1 litre of water, the pH value being brought to 7.4 by adding glacial acetic acid. 10 millicuries of I$^{131}$ in 1000 ml. of water are then added.

The original film is suspended in a frame in a conventional narrow upright rectangular tank containing the bleaching and activating solution. In the bottom of the tank is a shallow chamber separated from the main space within the tank by a porous crystal glass partition the underside of which is open to a source of nitrogen under pressure. When nitrogen is fed from the source to this chamber, it passes up through the porous glass partition and forms a cloud of very small bubbles in the bleaching and activating solution which rise up through it to agitate it to the required high degree.

This bleach and activation treatment must be continued for about 2½ hours, whereafter the film is transferred to another tank containing sodium bicarbonate solution, and is washed twice, for 20 minutes each time, again with strong agitation. This stage removes the background radioactivity in the gelatine of the film. Thereafter the film is washed for 3 hours in running water and rinsed in distilled water. It is then treated for 3 minutes in 3% acetic acid, rewashed in distilled water, and dried. The radioactive film is then ready for reading by a Geiger counter in a machine to be described.

Two readings are taken for each spot. The first is a reading of total ($\beta+\gamma$) radiation, and for the second a window of platinum 1 mm. thick and about 2 mm. diameter, which is opaque to $\beta$-radiation, is placed in front of the Geiger counter collimator. The second reading gives the counts per minute of $\gamma$-radiation, and by subtraction, the figure of counts per minute for $\beta$-radiation is obtained. This is the desired figure since $\beta$-radiation intensity is proportional to the optical density of a spot on the film.

Either immediately before or immediately after the reading of the radioactive image, the radioactivity of the control spots is measured so that the necessary correction (if any) can be made to allow for decay of the radioactivity of the image during the interval between the production of the radioactive image and the reading of the film.

One practical form of reading machine according to the invention will now be described, by way of illustration only, with reference to the accompanying perspective drawing. In this machine, a translucent carrier 1, of glass or plastic, or a combination of either with metal, is mounted in spring loaded conical bearings 2 in end plates 3 on a rigid frame 4, and an electric lamp 5 is mounted behind it. The drum is normally free to rotate, but may if preferred be controlled by a reduction gear drive (not shown) for fine adjustment, or alternatively a restraint may be imposed on its rotation by a light friction brake (not shown) or by the use of a high viscosity grease in the bearings 2.

The frame 4 has a pair of guide rails 6 extending between the end plates 3 which carry the drum bearings 2. The guide rails 6 are parallel to the drum axis, and one end of each rail may be held by a three-point suspension 7 which is adjustable to ensure this parallelism. On the guide rails 6 slides a carriage 8 on one end of which is clamped a Geiger counter housing 9 with its axis radial to the drum 1 and its collimator aperture 10 located as close as practicable to the drum surface.

The front end wall of the Geiger counter housing 9 carries a platinum slide 11 having a shield or window 12, approximately 1 mm. thick, different slides 11 with different sizes of windows 12 being provided so that the window area can be adjusted or selected to accommodate the area of radioactive image to be counted. The other end of the carriage 8 supports a telescope 13 focused on the drum 1 and provided with cross-wires for centering a spot on the visible duplicate image in the field of view.

The periphery of the drum 1 is provided with means for clamping an activated and a visible duplicate or control film substantially side by side on its cylindrical surface. Any suitable form of clamping device may be used, but one relatively simple arrangement consists of two sets of four accurately positioned studs 14, 15 (only two of each set are visible in the drawing) projecting slightly from the drum surface which engage corresponding register holes punched in each film, the spacing of the studs 14, 15 of each set being such as to ensure that the respective film is held thereby under tension. If, as is frequently the case with X-ray crystallography films, the film has to be read right up to the edge, a double-faced adhesive strip may be attached to the drum 1 where each edge of the film will lie, and the film may then be struck thereto after attachment to the studs 14 or 15.

The positions of the two sets of studs 14, 15 may be fixed, thereby determining the relative dispositions of the radioactive and visible control films or one set may be adjustable with respect to the other. Also one or more studs of a set may be biased circumferentially of the drum away from the others to ensure the maintenance of the requisite tension in a film. The studs 15 are thus illustrated in the accompanying drawing.

Various modifications of the above described apparatus may be made, as will be understood. For example, the Geiger counter 9 and telescope 13 may be mounted diametrically opposite each other with respect to the drum 1, thus shortening the axial length thereof. Alternatively again, the drum 1 may be arranged to slide axially as well as rotate so that the telescope 13 remains fixed in the frame 4 and the operator is not required to move whilst scanning a film.

In another arrangement, the drum 1 is of fine mesh or foraminous material over the area to be covered by each film (as indicated schematically at 16) and its interior is sealed and continually exhausted by a pump represented diagrammatically at 17, so that a film is held closely against the surface thereof by suction. This arrangement may also be supplemented by mechanical fixing means. Alternatively narrow slots may be formed through the cylindrical wall of the evacuated drum adjacent the edges of the film to perform the same function as the previously described adhesive strips.

In a still further alternative, the carrier may be in the form of a flat sheet of glass or transparent or translucent plastic material, and the sheet may be illuminated from one or more edges. Alternatively, such a flat carrier may be in the form of a hollow and shallow sealed box with slotted or foraminous film-forming surfaces, the interior of the carrier being evacuated by a pump.

In any of the above alternative arrangements of the apparatus, manual scanning can be replaced by automatic operation, the counts being recorded automatically. For this purpose the telescope or eyepiece 13 focused on the control film may be replaced by an optical scanning system whose design is appropriate to the kind of recorder used.

In all forms of the invention, it is important to ensure that the spacing of the film from the counting surface of the Geiger counter 9 remains constant over the whole surface to be scanned. This is easily achieved by stretching the film over the drum whose external radius is held to close limits, at least over the zone to which a film is to be attached. Furthermore, where the original film is mounted within a cylinder during exposure, as in some types of X-ray crystallographic camera, it is advantageous to arrange for the carrier to be of the same or slightly less radius.

In order to facilitate still further the snug fitting of the film on the drum 1, the film may be mounted during the activation process on a cylindrical frame in a vessel equipped with efficient means of agitation, and the whole process may be carried out without disturbing the film by changing the solutions in the vessel.

Although the foregoing description emphasises the application of the invention to X-ray crystallography, it is to be understood that it is equally applicable to any other scientific or industrial process involving the estimation of the density of a photographic image, or the measurement of the silver content of such images, especially over small areas.

What we claim is:

1. The method of analysis of a specimen by a protographic process comprising the steps of preparing a stable original photographic record bearing an analytical image of the specimen; making a stable duplicate record bearing a visible copy of such original image; converting said original image into a radioactive image; scanning both images simultaneously by respective radiation-responsive and optical devices and synchronising the motions of said scanning devices.

2. In the analysis of a specimen by a photographic process, producing an original image of the specimen on sensitised material; exposing a selected portion of the surface of said sensitised material to direct radiation of predetermined intensity for a known time to produce a calibration mark; stabilising said original image and calibration mark; converting said original image and calibration mark into radioactive counterparts; scanning both the radioactive and the visible duplicate images simultaneously by respective radiation-responsive and optical devices, and synchronizing the scanning motions of said scanning devices.

3. The method of photographic analysis of a specimen comprising producing an original stable visible image of the specimen; producing a duplicate stable visible record of said original image; converting said original image into a radioactive record thereof so that the radioactivity of any given point on said latter record is proportional to the optical density of the same point on said original image; aligning an optical viewing system with a given point on said duplicate visible record; controlling a radioactivity-responsive device, such as a Geiger counter, from said optical viewing system so as to align it with the corresponding point on said radioactive record, and evaluating the output of said device at successive points on said radioactive record.

4. In the process according to claim 1, the step of producing on both the radioactive and visible records corresponding registration marks to facilitate accurate relative location of said records for scanning purposes.

5. In the process according to claim 1 and treating the said original stable image by immersing it for about two and a half hours in a solution of potassium ferricyanide and potassium iodide containing radioactive $I^{131}$ in a concentration of at least 10 $\mu$-curies per cc., and strongly agitating the bath continuously so as to convert said original silver image to an invisible bleached and radio-active record thereof.

6. The method according to claim 3 wherein the visible and radioactive records are aligned on a common carrier in their correct relative positions with respect to said optical viewing system and said radioactivity-responsive device, respectively, and said device is caused to scan said radioactive record in synchronism with the scanning of said visible record by said optical system.

7. Apparatus for scanning an optically invisible photographic record comprising a rigid carrier having a surface for supporting said record and an optically visible duplicate thereof in predetermined correlation; a device for viewing a zone of said invisible record; an optical system for viewing a corresponding zone of said duplicate; means for traversing said optical system over said duplicate record; and an operative connection between said optical system and said device for causing the latter to view a zone of said invisible record corresponding to the zone of said duplicate record which is viewed by said optical system at any given instant.

8. Apparatus for scanning a radioactive photographic record comprising a rigid carrier having a surface for supporting said record and an optically visible duplicate thereof, in predetermined correlation; a Geiger counter for viewing said radioactive record; an optical telescope for viewing said duplicate record; means for traversing said telescope over said optical duplicate; and a coupling between said Geiger counter and said telescope for causing said Geiger counter to move in unison with said telescope and to view a zone of said radioactive record corresponding to the zone of said optical duplicate viewed at any given instant by said telescope.

9. Apparatus for scanning a radioactive photographic record comprising a drum rotatable about its axis; means for clamping said radioactive record and an optically visible duplicate thereof in diametrically opposed relation on the cylindrical surface of said drum; a Geiger counter traversible parallel to a generatrix of said cylindrical surface and passing through said radioactive record; an optical telescope traversible parallel to another generatrix diametrically opposed to said first-mentioned generatrix; and a rigid connection between said Geiger counter and said optical telescope.

10. Apparatus for scanning an invisible radioactive photographic record comprising a frame; a drum rotatable about its axis and axially displaceable in said frame; means for clamping said invisible record and an optically visible duplicate thereof on the cylindrical surface of said drum in predetermined correlation; a Geiger counter fixed in said frame for scanning said invisible record; and an optical telescope fixed in said frame for scanning said visible duplicate and spaced from said Geiger counter in the same predetermined correlation as that of said invisible record and its duplicate.

11. The process according to claim 5 wherein the agitation of the bath is achieved by continuously bubbling nitrogen therethrough in a dense cloud of very small bubbles.

12. The process according to claim 11 wherein the bleached and radioactive record is washed twice in a sodium bicarbonate solution, for twenty minutes each time, with strong agitation of the solution, to remove background radioactivity.

13. The process according to claim 12 wherein the radioactive record is washed in water and treated for 3 minutes in a 3% solution of acetic acid.

14. Apparatus according to claim 8 wherein the carrier for the records comprises a drum rotatable about its axis and having means for clamping the records side-by-side on its periphery.

15. Apparatus according to claim 14 wherein the drum is translucent, and a source of light is located behind it so as to illuminate the visibile record.

16. Apparatus according to claim 8 wherein the carrier is a drum which is made of fine mesh or foraminous material over the area where the respective records are to be mounted, and the interior of the drum is sealed and coupled to an air exhaust pump.

References Cited in the file of this patent
UNITED STATES PATENTS

| | | |
|---|---|---|
| 2,407,381 | Pecher | Sept. 10, 1946 |
| 2,603,755 | De Ment | July 15, 1952 |
| 2,829,274 | Shreck | Apr. 1, 1958 |
| 2,830,900 | Land et al. | Apr. 15, 1958 |
| 2,835,577 | Levy | May 20, 1958 |